US012477673B2

United States Patent
Lee et al.

(10) Patent No.: US 12,477,673 B2
(45) Date of Patent: Nov. 18, 2025

(54) ELECTRONIC DEVICE COMPRISING DISPLAY SUPPORT MEMBER

(71) Applicant: SAMSUNG ELECTRONICS CO., LTD., Suwon-si (KR)

(72) Inventors: Minsung Lee, Suwon-si (KR); Jaeho Kang, Suwon-si (KR); Jungjin Kim, Suwon-si (KR); Hyungsoo Kim, Suwon-si (KR); Iksu Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 18/310,852

(22) Filed: May 2, 2023

(65) Prior Publication Data

US 2023/0276585 A1    Aug. 31, 2023

Related U.S. Application Data

(63) Continuation of application No. PCT/KR2021/013444, filed on Sep. 30, 2021.

(30) Foreign Application Priority Data

Nov. 25, 2020  (KR) .................. 10-2020-0159939
Jan. 18, 2021  (KR) .................. 10-2021-0006783

(51) Int. Cl.
*H05K 5/02* (2006.01)
*G06F 1/16* (2006.01)

(52) U.S. Cl.
CPC ......... *H05K 5/0217* (2013.01); *G06F 1/1624* (2013.01); *G06F 1/1652* (2013.01)

(58) Field of Classification Search
CPC ... H05K 5/0217; G06F 1/1624; G06F 1/1637; G06F 1/1652; G09F 9/30
See application file for complete search history.

(56) References Cited

U.S. PATENT DOCUMENTS 9,164,547 B1 * 10/2015 Kwon .................. G06F 1/1652
10,742,784 B1    8/2020 Jo et al.
(Continued)

FOREIGN PATENT DOCUMENTS

CN    111664337 A    9/2020
KR    20170022684 A    3/2017
(Continued)

OTHER PUBLICATIONS

International Search Report for PCT/KR2021/013444 mailed Jan. 7, 2022, 9 pages.

(Continued)

*Primary Examiner* — Sagar Shrestha
(74) *Attorney, Agent, or Firm* — Nixon & Vanderhye P.C.

(57) ABSTRACT

An electronic device may include: a housing including a first housing, and a second housing accommodating at least a portion of the first housing and guiding a sliding movement of the first housing; a flexible display including a first display area connected to the first housing, and a second display area extending from the first display area; and a display support member supporting at least a portion of the second display area, wherein the display support member includes a plurality of bars which are arranged side by side and include a first processing structure formed on a side surface, wherein the plurality of bars may include: a first bar including a processing structure having a protrusion or groove shape; and a second bar at least partially facing the processing structure and including a processing structure corresponding to the shape of the processing structure.

14 Claims, 11 Drawing Sheets

(56) References Cited

U.S. PATENT DOCUMENTS

| | | | |
|---|---|---|---|
| 10,904,371 B1* | 1/2021 | Song | G06F 1/1656 |
| 10,955,876 B1* | 3/2021 | Song | G06F 1/1652 |
| 11,497,130 B2* | 11/2022 | Song | G06F 1/1624 |
| 2012/0196482 A1 | 8/2012 | Stokoe | |
| 2015/0062840 A1* | 3/2015 | Kim | H05K 5/0217 |
| | | | 361/749 |
| 2015/0325804 A1 | 11/2015 | Lindblad | |
| 2017/0238412 A1 | 8/2017 | Huitema et al. | |
| 2017/0285688 A1 | 10/2017 | Sun | |
| 2018/0077810 A1 | 3/2018 | Moon et al. | |
| 2019/0196541 A1* | 6/2019 | O'Neil | G06F 1/1652 |
| 2019/0196548 A1* | 6/2019 | Kim | G06F 1/1681 |
| 2019/0268455 A1* | 8/2019 | Baek | G06F 1/1652 |
| 2020/0060028 A1* | 2/2020 | Kim | H10K 50/84 |
| 2020/0249722 A1 | 8/2020 | Cha | |
| 2021/0385315 A1 | 12/2021 | Cha et al. | |
| 2023/0073467 A1* | 3/2023 | Hwang | G06F 1/1652 |
| 2023/0130795 A1* | 4/2023 | Yoon | H04M 1/0268 |
| | | | 361/807 |
| 2023/0393623 A1* | 12/2023 | Wang | G06F 1/1618 |

FOREIGN PATENT DOCUMENTS

| | | |
|---|---|---|
| KR | 20180029590 A | 3/2018 |
| KR | 20190111163 A | 10/2019 |
| KR | 20200095309 A | 8/2020 |
| KR | 20200124989 A | 11/2020 |
| WO | 2020211947 A1 | 10/2020 |

OTHER PUBLICATIONS

Written Opinion of the ISA for PCT/KR2021/013444 mailed Jan. 7, 2022, 4 pages.

Korean Office Action dated Mar. 14, 2025 for KR Application No. 10-2021-0006783.

* cited by examiner

ELECTRONIC DEVICE COMPRISING DISPLAY SUPPORT MEMBER

CROSS REFERENCE TO RELATED APPLICATIONS

This application is a continuation of International Application No. PCT/KR2021/013444 filed on Sep. 30, 2021, designating the United States, in the Korean Intellectual Property Receiving Office, and claiming priority to Korean Patent Application No. KR 10-2020-0159939, filed Nov. 25, 2020, and Korean Patent Application No. KR 10-2021-0006783, filed Jan. 18, 2021, the disclosures of which are all hereby incorporated by reference herein in their entireties.

BACKGROUND

Field

Various example embodiments relate to an electronic device including a display supporting member.

Description of Related Art

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling and e-wallet functions. Such electronic devices become compact enough for users to carry in a convenient way.

As mobile communication services extend up to multimedia service sectors, electronic devices require a larger display to allow users satisfactory use of multimedia services as well as voice call or text messaging services. This, however, trades off the trend of electronic devices being compact.

An electronic device (e.g., a portable terminal) includes a display with a flat surface or both a flat and curved surface. An electronic device including a display may have a limitation in realizing a screen larger than the size of the electronic device due to the fixed display structure. Accordingly, research has been conducted on foldable or rollable electronic devices.

A rollable electronic device may include a flexible display and a display supporting member supporting the display. The display supporting member may support the display by a plurality of bars and be rolled up with the display. However, since the plurality of bars are individually formed through a cutting process, the convenience of the manufacturing process may decrease, and manufacturing costs may increase.

Further, in implementing a rollable electronic device, it may be difficult to secure mechanical stability while enabling the housings of the electronic device to move relative to one another (e.g., slide).

SUMMARY

According to various example embodiments, there may be provided an electronic device including a display support to save manufacturing costs while increasing manufacturing convenience.

According to various example embodiments, there may be provided an electronic device including different adhesive members to increase the durability of the display.

The disclosure is not limited to the foregoing embodiments but various modifications or changes may rather be made thereto without departing from the spirit and scope of the disclosure.

According to various example embodiments, an electronic device may comprise a housing including a first housing and a second housing configured to accommodate at least a portion of the first housing and to guide a sliding movement of the first housing, a flexible display including a first display area connected, directly or indirectly, with the first housing and a second display area extending from the first display area, and a display support supporting at least a portion of the second display area. The display support may include a plurality of bars arranged side by side and including a first processed structure formed on a side surface thereof. The plurality of bars may include a first bar including a 1-1th processed structure shaped as a protrusion or a recess and a second bar including a 1-2th processed structure at least partially facing the 1-1th processed structure and corresponding in shape to the 1-1th processed structure.

According to various example embodiments, an electronic device may comprise a housing including a first housing and a second housing for receiving at least a portion of the first housing and guiding a slide of the first housing, a flexible display including a first display area connected, directly or indirectly, with the first housing and a second display area extending from the first display area, a display supporting member including a plurality of bars including at least one first processed structure formed on a side surface thereof, and a first adhesive member including a 1-1th adhesive member disposed between the first display area and the first housing and a 1-2th adhesive member disposed between the second display area and the plurality of bars. An elastic modulus of the 1-2th adhesive member may be greater than an elastic modulus of the 1-1th adhesive member.

According to various example embodiments, the display supporting member may be formed by injection molding, thus increasing the convenience of the process of manufacturing the electronic device while saving manufacturing costs.

According to various example embodiments, the electronic device may include different adhesive members disposed in a display area, which is rollable, and a display area, which is not rollable, respectively. The adhesive members are disposed corresponding to the structure of the display, making it possible to maintain the adhesivity of the display while reducing or preventing inter-layer separation of the display and increasing the durability of the display.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
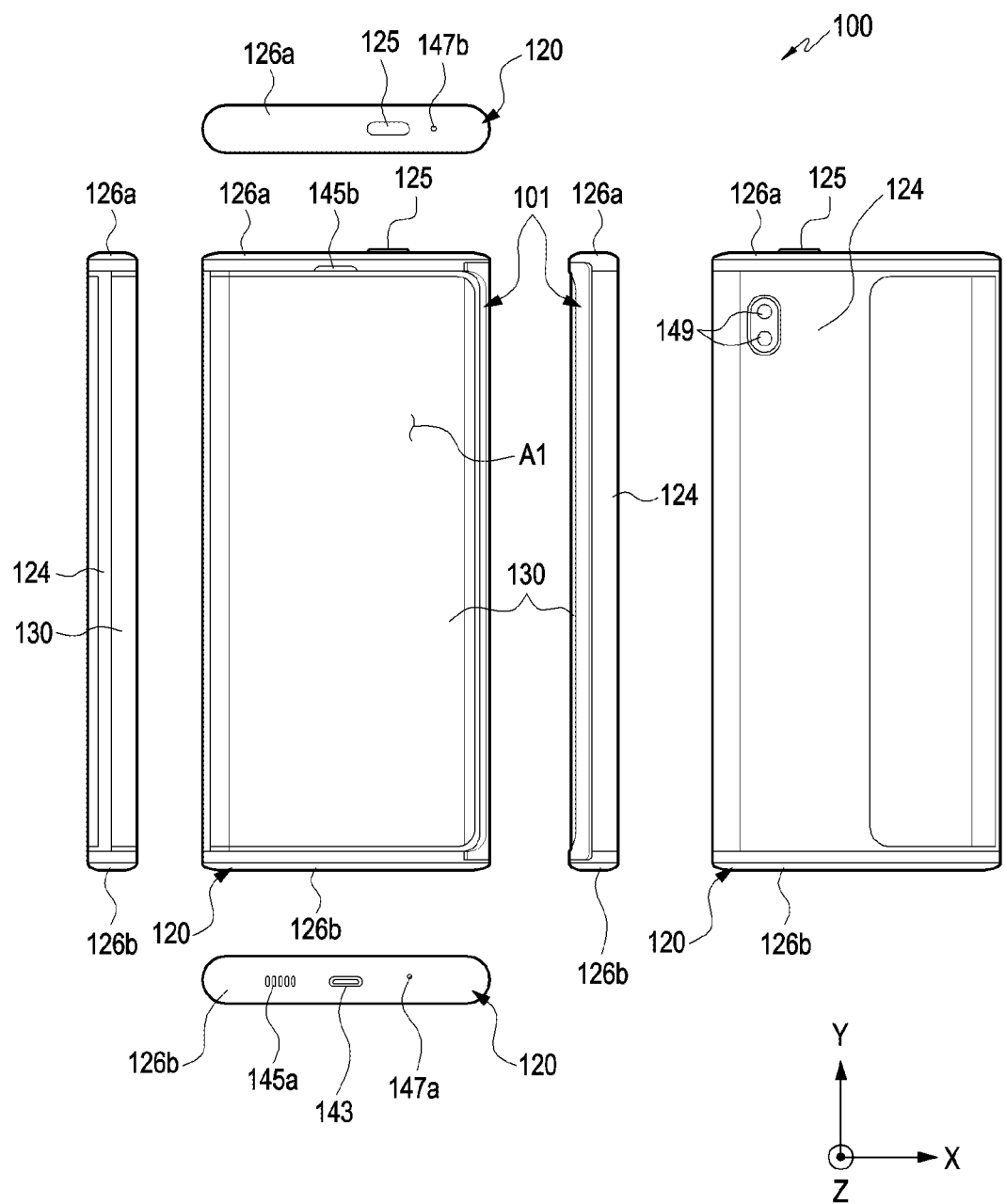
FIG. 1 is a view illustrating a state in which a second display area of a flexible display is received in a second housing, according to various example embodiments.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a view illustrating a state in which a second display area of a flexible display is received in a second housing, according to various example embodiments.

Figure 2:
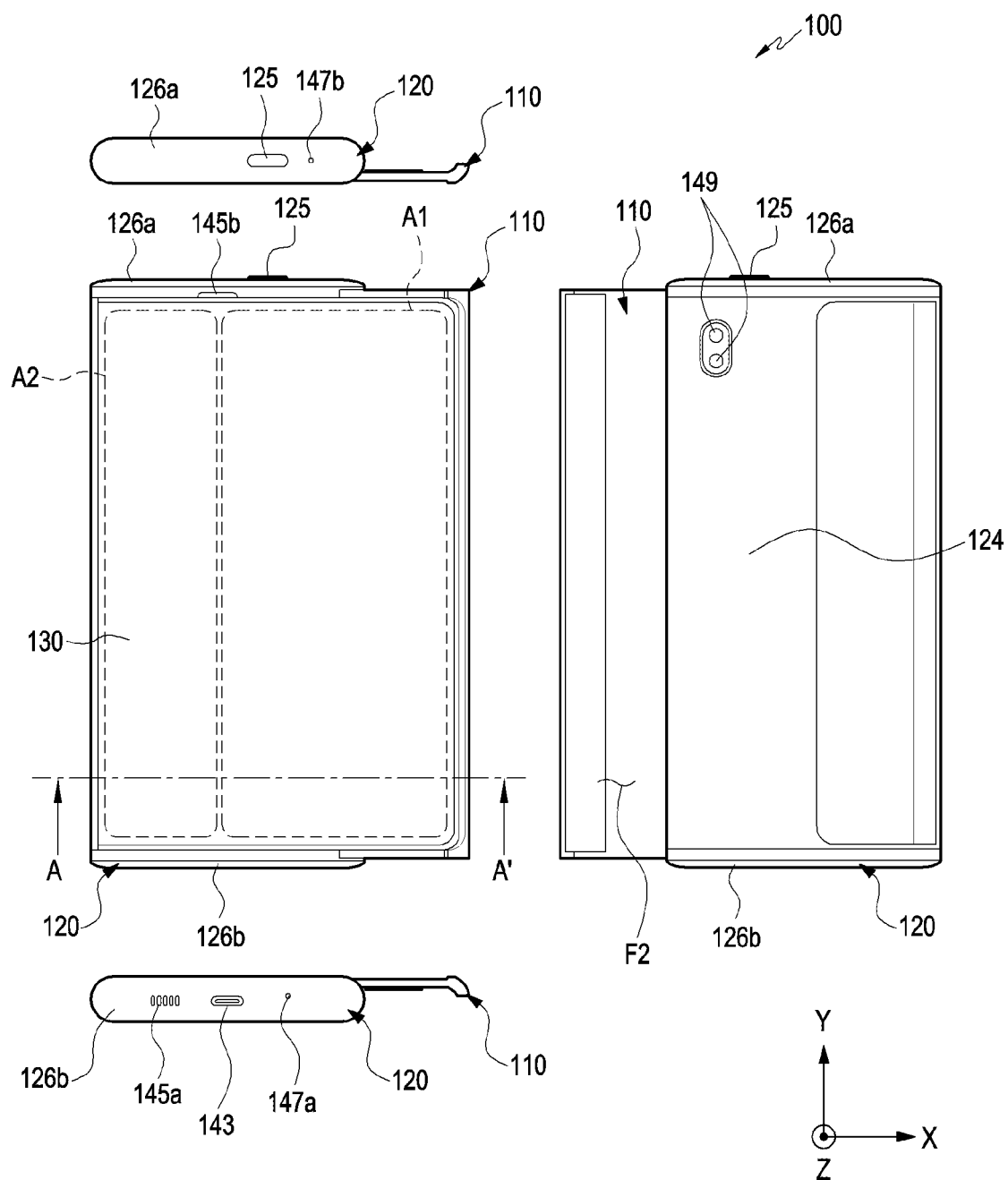
FIG. 2 is a view illustrating a state in which a second display area of a flexible display is exposed to the outside of a second housing, according to various example embodiments.

FIG. 2 is a view illustrating a state in which a second display area of a flexible display is exposed to the outside of a second housing, according to various example embodiments.

The state shown in FIG. 1 may be defined as a first housing 110 being closed with respect to a second housing 120, and the state shown in FIG. 1 may be defined as the first housing 110 being open with respect to the second housing 120. According to an embodiment, the "closed state" or "opened state" may be defined as a closed or open state of the electronic device.

Referring to FIGS. 1 and 2, an electronic device 100 may include a housing 110 and 120 and a flexible display 130 (hereinafter, display). The housings 110 and 120 may include a second housing 120 and a first housing 110 movably disposed with respect to the second housing 120. According to an embodiment, the electronic device 100 may be interpreted as having a structure in which the second housing 120 is slidably disposed on the first housing 110. According to an embodiment, the first housing 110 may be disposed to perform reciprocating motion by a predetermined distance in the shown direction with respect to the second housing 120, e.g., a first direction (e.g., X-axis direction).

According to various embodiments, the first housing 110 may be referred to as, e.g., a first structure, a slide part, a slide bracket, or a slide housing, and may be disposed to reciprocate with respect to the second housing 120. According to an embodiment, the second housing 120 may be referred to as, e.g., a second structure, a main part, a base bracket, or a main housing. A portion (e.g., the first display area A1) of the display 130 may be disposed on the first housing 110. According to an embodiment, the second housing 120 may receive various electrical and electronic components, such as a circuit board or a battery.

According to an embodiment, at least a portion of another portion (e.g., the second display area A2) of the display 130 may be received (e.g., slide-in) into the inside of the second housing 120 or be visually exposed (e.g., slide-out) to the outside of the second housing 120 as the first housing 110 moves (e.g., slides) with respect to the second housing 120.

According to various embodiments, the first housing 110 may include a front surface (e.g., the front surface F1 of FIG. 3) facing at least a portion of the display 130 and a rear surface (e.g., rear surface) F2 facing in the direction opposite to the front surface F1. According to an embodiment, the first plate 110 may support at least a portion (e.g., the first display area A1) of the display 130.

According to various embodiments, the second housing 120 may include a rear plate 124. According to an embodiment, the rear plate 124 may substantially form at least a portion of the exterior of the second housing 120 or the electronic device 100. According to an embodiment, the rear plate 124 may provide a decorative effect on the exterior of the electronic device 100. The rear plate 124 may be formed of at least one of metal, glass, synthetic resin, or ceramic. According to an embodiment, the rear plate 124 may be formed of a material that transmits light at least partially (e.g., the auxiliary display area). For example, in a state in which a portion of the display 130 (e.g., the second display area A2) is received in the electronic device 100, the electronic device 100 may output visual information using the second display area A2. The auxiliary display area may be a portion of the rear plate 124 in which the display 130 received in the second housing 120 is positioned.

According to various embodiments, the second housing 120 may include side members 126a and 126b. The side members 126a and 126b may include a first side member 126a and a second side member 126b substantially parallel to the first side member 126a. According to an embodiment, the first side member 126a and the second side member 126b may form at least a portion of the exterior of the electronic device 100. According to an embodiment, the side members 126a and 126b may include at least one speaker hole 145a or microphone holes 147a and 147b.

According to various embodiments, the second housing 120 may receive the first housing 110. For example, the first housing 110 may be received in the second housing 120 in a state of being at least partially surrounded by the rear plate 124, the first side member 126a, and the second side member 126b and be guided by the second housing 120 while sliding in a direction, e.g., the first direction (e.g., X-axis direction), parallel to the first surface (e.g., front surface) F1 or the second surface F2.

According to various embodiments, the display 130 may include a first display area A1 and a second display area A2. According to an embodiment, the first display area A1 may be disposed on the first housing 110. For example, the first display area A1 may be disposed on the front surface F1 of the first housing 110. The second display area A2 may extend from the first display area A1 and be inserted or received into the inside of the second housing 120 or exposed to the outside of the second housing 120 as the first housing 110 slides.

According to various embodiments, the second display area A2 may be substantially moved while being guided by a roller (e.g., the first roller 151 of FIG. 3) mounted on the second housing 120 and may thus be received into the inside of the second housing 120 or visually exposed to the outside. According to an embodiment, the second display area A2 may move based on a slide of the first housing 110 in the first direction (e.g., the direction indicated by the arrow η). For example, while the first housing 110 slides, a portion of the second display area A2 may be deformed into a curved shape in a position corresponding to the first roller 151.

According to various embodiments, when viewed from above the first housing 110 (e.g., Z-axis direction), if the first housing 110 is moved from the closed state to opened state, the second display area A2 may be gradually exposed to the outside of the second housing 120 while, together with the first display area A1, substantially forming a plane. The display 103 may be disposed to be coupled with, or adjacent, a touch detecting circuit, a pressure sensor capable of measuring the strength (pressure) of touches, and/or a digitizer for detecting a magnetic field-type stylus pen. According to an embodiment, the second display area A2 may be at least partially received inside the second housing 120, and a portion of the second display area A2 may be visually exposed to the outside even in the state shown in FIG. 1 (e.g., the closed state). According to an embodiment, irrespective of the closed state or the opened state, the visually exposed portion of the second display area A2 may be positioned on the roller (e.g., the first roller 151 of FIG. 3), and a portion of the second display area A2 may remain in the curved shape in the position corresponding to the first roller 151.

According to various embodiments, the electronic device 100 may include a key input device 125, a connector hole 143, audio modules 145a, 145b, 147a, and 147b, or a camera module 149. Although not shown, the electronic device 100 may further include an indicator (e.g., a light emitting diode (LED) device) or various sensor modules.

According to various embodiments, the key input device 125 may be disposed on the outer surface of the second housing 120. For example, the key input device 125 may be disposed on the first side member 126a or the second cover member 126b. Depending on the appearance and the state of use, the electronic device 100 may be designed to omit the illustrated key input device 125 or to include additional key input device(s). According to an embodiment, the electronic device 100 may include a key input device (not shown), e.g., a home key button or a touchpad disposed around the home key button. According to an embodiment, at least a portion of the key input device 125 may be positioned on an area of the first housing 110.

According to various embodiments, the connector hole 143 may be omitted or may receive a connector (e.g., a universal serial bus (USB) connector) for transmitting and receiving power and/or data with an external electronic device. Although not shown, the electronic device 100 may include a plurality of connector holes 143, and some of the plurality of connector holes 143 may function as connector holes for transmitting/receiving audio signals with an external electronic device. In the illustrated embodiment, the connector hole 143 is disposed in the second side wall 126b, but the present scope is not limited thereto. For example, the connector hole 143 or a connector hole not shown may be disposed in the first side wall 126a.

According to various embodiments, the audio modules 145a, 145b, 147a, and 147b may include speaker holes 145a and 145b or microphone holes 147a and 147b. One of the speaker holes 145a and 145b may be provided as a receiver hole for voice calls, and the other may be provided as an external speaker hole. The electronic device 100 may include a microphone for obtaining sound. The microphone may obtain external sound of the electronic device 100 through the microphone holes 147a and 147b. According to an embodiment, the electronic device 100 may include a plurality of microphones to detect the direction of sound. According to an embodiment, the speaker holes 145a and 145b and the microphone holes 147a and 147b may be implemented as one hole, or a speaker may be included without the speaker holes 145a and 145b (e.g., a piezo speaker). According to an embodiment, the speaker hole indicated by reference number "145b" may be disposed in the first housing 110 to be used as a receiver hole for voice call, the speaker hole (e.g., external speaker hole) indicated by reference number "145a" or the microphone holes 147a and 147b may be disposed in the first side member 126a and/or second side member 126b of the second housing 120.

According to various embodiments, the camera module 149 may be positioned in the second housing 120 and may capture a subject in a direction opposite to the first display area A1 of the display 130. The electronic device 100 may include a plurality of camera modules 149, each camera module comprising a camera. For example, the electronic device 100 may include at least one of a wide-angle camera, a telephoto camera, or a close-up camera. According to an embodiment, the electronic device 200 may measure the distance to the subject by including an infrared projector and/or an infrared receiver. The camera module 149 may include one or more lenses, an image sensor, and/or an image signal processor. Although not shown, the electronic device 100 may further include another camera module (e.g., a front camera) that captures the subject in a direction opposite to the camera module 149 of the display 130. For example, the front camera may be disposed around the first display area A1 or in an area overlapping the display 130 and, when disposed in the area overlapping the display 130, the front camera may capture the subject through the display 130.

According to various embodiments, an indicator (not shown) of the electronic device 100 may be disposed on the first housing 110 or the second housing 120, and the indicator may include a light emitting diode to provide state information about the electronic device 100 as a visual signal. The sensor module (not shown) of the electronic device 100 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 3:
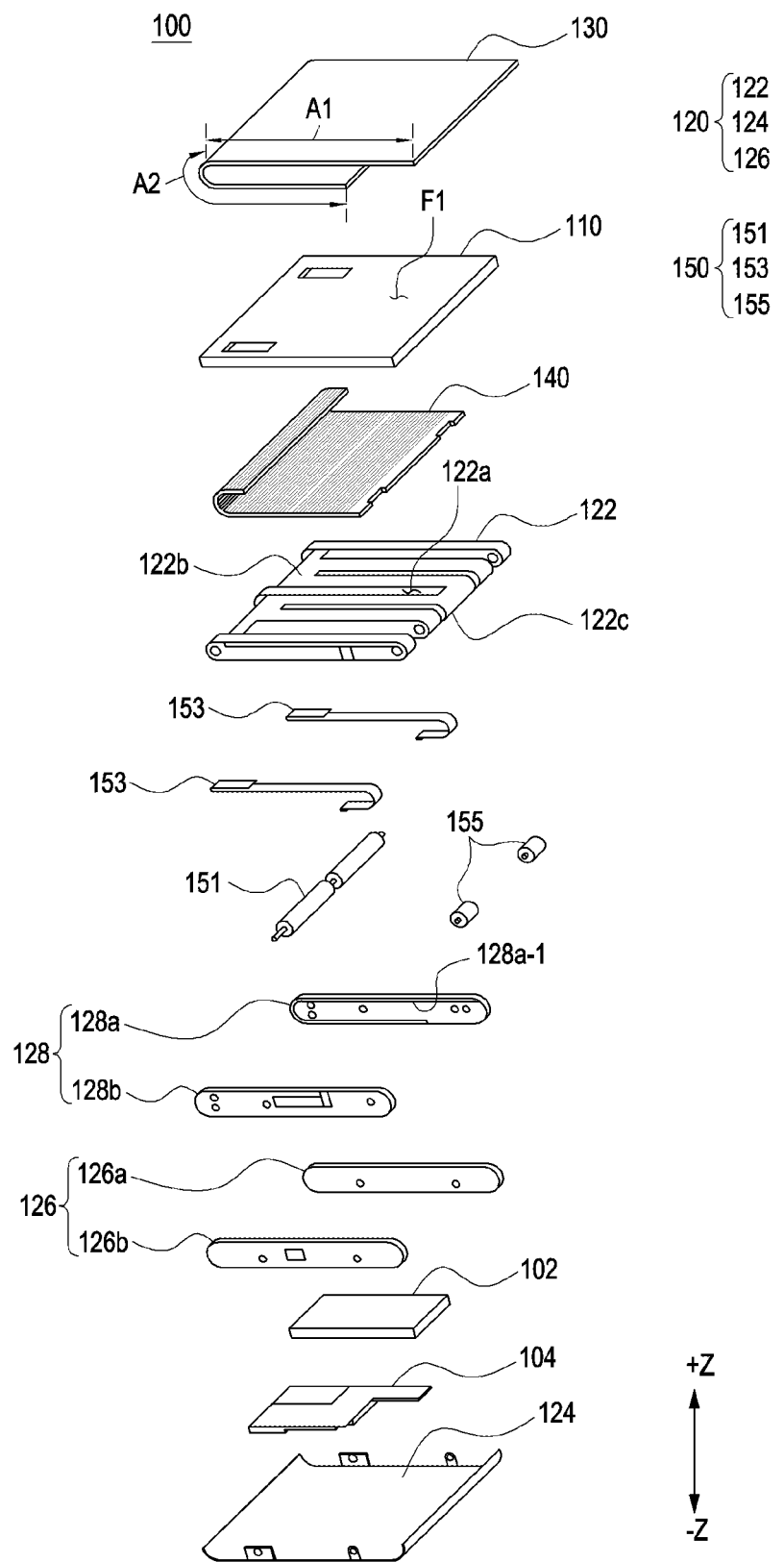
FIG. 3 is a perspective view illustrating an electronic device according to various example embodiments.
Figure 4:
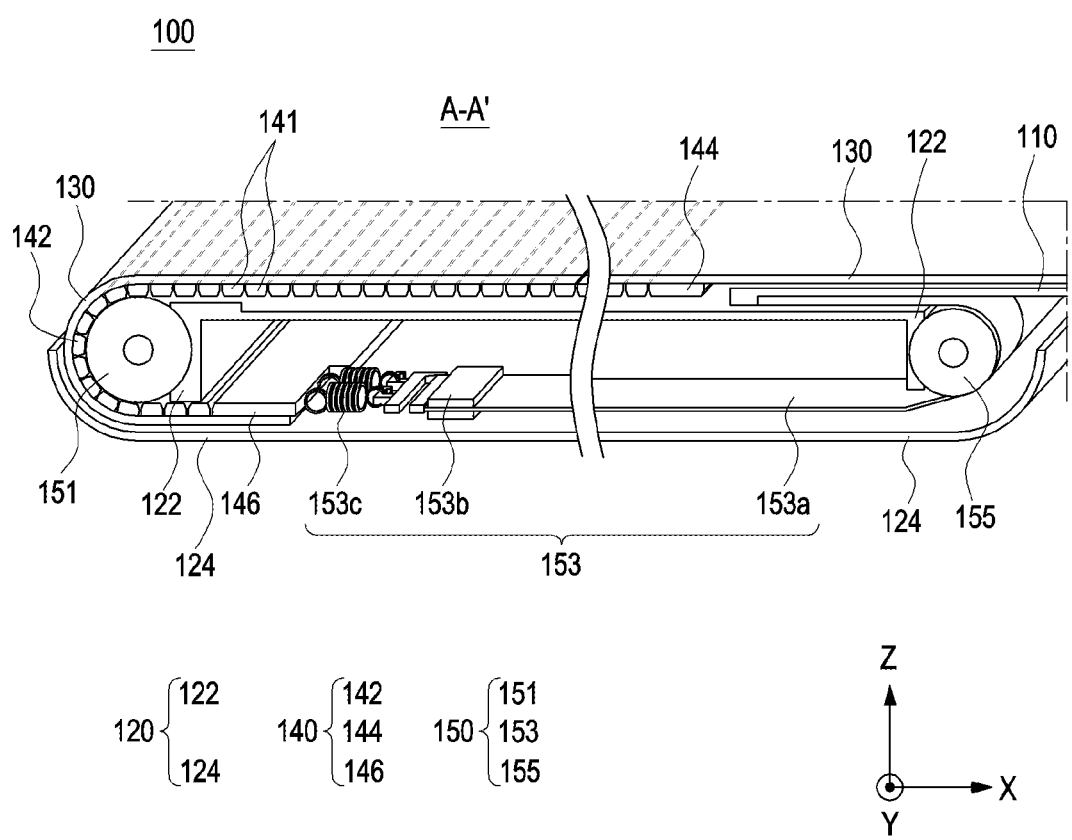
FIG. 4 is a cross-sectional view taken along line A-A' of FIG. 2.

FIG. 3 is a perspective view illustrating an electronic device according to various example embodiments; FIG. 4 is a cross-sectional view taken along line A-A' of FIG. 2;

Referring to FIGS. 3 and 4, an electronic device 100 may include a first housing 110, a second housing 120, a display 130, and a display supporting member 140 for supporting at least a portion of the display 130. The configuration of the first housing 110, the second housing 120, and the display 130 of FIG. 3 may be identical in whole or part to the configuration of the first housing 110, the second housing 120, and the display 130 of FIGS. 1 and 2.

According to various embodiments, the first housing 110 may support a portion of the display 130. For example, the first housing 110 may include a front surface F1 of the first housing 110, facing a portion (e.g., the first display area A1) of the display 130.

According to various embodiments, the second housing 120 may include a base bracket 122. According to an embodiment, the base bracket 122 may receive components (e.g., the battery 102 and the circuit board 104) of the electronic device 100.

According to various embodiments, the second housing 120 may include at least one accommodating groove 122a. According to an embodiment, the accommodating groove 122a may receive a portion of the display supporting member 140 and guide the slide of the display supporting member 140. According to an embodiment, the accommodating groove 122a may be formed in the base bracket 122. For example, the accommodating groove 122a may be formed in the front surface 122b and side surface 122c of the base bracket 122.

According to various embodiments, the electronic device 100 may include a guide member 128. According to an embodiment, the second housing 120 may include a first guide member 128a connected, directly or indirectly, to the first sidewall 126b and a second guide member 128b connected to the second sidewall 126b. The first guide member 128a and the second guide member 128b may include at least one recess (e.g., recess 128a-1) for receiving the display supporting member 140, and the display supporting member 140 may slide along the recess in the first guide member 128a and the second guide member 128b. According to an embodiment, at least a portion (e.g., first guide member 128a and second guide member 128b) of the guide member 128 may be interpreted as a portion of the second housing 120.

According to various embodiments, the display supporting member 140 may support at least a portion (e.g., the second display area A2) of the display 130. For example, the display supporting member 140, along with the first housing 110, may support the display 130. According to an embodiment, as the first housing 110 slides, the display supporting member 140 may move with respect to the second housing 120. For example, the display 130 may be connected, directly or indirectly, with the first housing 110 and the display supporting member 140. According to an embodiment, the display supporting member 140 may move along the first roller 151.

According to various embodiments, the display supporting member 140 may include a plurality of bars 141 or rods. The plurality of bars 141 may extend in a straight line and be disposed parallel to the rotational axis (e.g., Y-axis direction) of the first roller 151 and be disposed substantially side by side along the direction (e.g., the sliding direction (X-axis direction) of the first housing 110) perpendicular to the rotational axis (e.g., Y-axis direction) of the first roller 151.

According to various embodiments, each bar 141 may pivot around the first roller 151 while remaining parallel to another adjacent bar 141. According to an embodiment, as the first housing 110 slides, the plurality of bars 141 may be arranged to form a curved shape or may be arranged to form a planar shape. For example, as the first housing 110 slides, a portion of the display supporting member 140 facing the first roller 151 may form a curved surface, and another portion of the display supporting member 140 that does not face the first roller 151 may form a flat surface. According to an embodiment, the second display area A2 of the display 130 may be mounted or supported on the display supporting member 140, and in the open state (e.g., FIG. 2), at least a portion of the second display area A2, along with the first display area A1, may be visually exposed to the outside of the second housing 120. In the state in which the second display area A2 is exposed to the outside of the second housing 120, the display supporting member 140 may substantially form a flat surface, thereby supporting or maintaining at least a portion of the second display area A2 in the flat state. According to an embodiment, the display supporting member 140 may be interpreted as an articulated hinge structure.

According to various embodiments, the display supporting member 140 may include a multi-bar assembly 142 including a plurality of bars 141, a first bracket 144 adjacent to one end portion 142*a* of the multi-bar assembly 142, and a second bracket 146 adjacent to the other end portion 142*b* which is opposite to the one end portion 142*a*. According to an embodiment, the multi-bar assembly 142 may be disposed between the first bracket 144 and the second bracket 146. According to an embodiment the first bracket 144 may be disposed between the multi-bar assembly 142 and the first housing 110. According to an embodiment, the first bracket 144 may be interpreted as a portion of the first housing 110. According to an embodiment, in the unrolled state (e.g., FIG. 2) of the electronic device 100, the second bracket 146 may be disposed in the housings 110 and 120 and be not visually exposed. According to an embodiment, the second bracket 146 may be connected, directly or indirectly, with at least one spring structure 153*c*. According to an embodiment, the second bracket 146 may be larger in width than the bar 141. According to an embodiment, the bar 141 connected, directly or indirectly, with the spring structure 153*c* among the plurality of bars 141 may be interpreted as the second bracket 146.

According to various embodiments, the electronic device 100 may include a slide guide member 150 for the slide of the first housing 110 with respect to the second housing 120. The slide guide member 150 may include a first roller 151, at least one elastic belt structure 153, and at least one second roller 155.

According to various embodiments, the first roller 151 may guide the movement of the display 130 and/or the display supporting member 140. According to an embodiment, the first roller 151 may be rotatably mounted on an edge of the base bracket 122. According to an embodiment, the first roller 151 may guide the slide of the second display area A2 while rotating along the rotational axis (e.g., Y axis).

According to various embodiments, the elastic belt structure 153 may guide the slide of the display supporting member 140. For example, the elastic belt structure 153 may be connected to the first housing 110 and second housing 120 and provide an elastic force to the display supporting member 140. For example, the elastic belt structure 153 may include an elastic belt 153*a* connected with the first housing 110, an elastic belt bracket 153*b* connected with the elastic belt 153*a* and fixed to the rear plate 124, and a spring structure 153*c* connected with the elastic belt bracket 153*b* and the display supporting member 140. According to an embodiment, the elastic belt 153*a* and the spring structure 153*c* may provide elastic force in different directions with respect to the display supporting member 140. The display supporting member 140 may receive the elastic force in the opposite directions by the elastic belt 153*a* and the spring structure 153*c*, so that the wrinkles or creases of the display 130 and/or the display supporting member 140 may be reduced.

According to various embodiments, the second roller 155 may guide the movement of the elastic belt structure 153. According to an embodiment, the second roller 155 may be rotatably mounted on another edge of the base bracket 122. According to an embodiment, the second roller 155 may rotate along the rotational axis (e.g., Y axis) while guiding the slide of the elastic belt 153*a*.

According to various embodiments, the electronic device 100 may include a battery 102. The battery 102 may supply power to at least one component of the electronic device 100. According to an embodiment, the battery 102 may include, for example, a primary cell which is not rechargeable, a secondary cell which is rechargeable, or a fuel cell. According to an embodiment, the battery 102 may be disposed in the housings 110 and 120. For example, the battery 102 may be mounted on a portion (e.g., the base bracket 122) of the second housing 120.

According to various embodiments, the electronic device 100 may include a printed circuit board 104 on which a processor (not shown) or a memory (not shown) is mounted. According to an embodiment, the printed circuit board 104 may be disposed in the housings 110 and 120. For example, the printed circuit board 104 may be disposed between the base bracket 122 and the rear plate 124.

The processor may execute, for example, software (e.g., a program) to control at least one other component (e.g., a hardware or software component) of the electronic device 100 coupled with the processor, and may perform various data processing or computation. According to an embodiment, the processor may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor.

The memory may store various data used by at least one component (e.g., the processor) of the electronic device 100. The memory may include a volatile or non-volatile memory.

Figure 5:
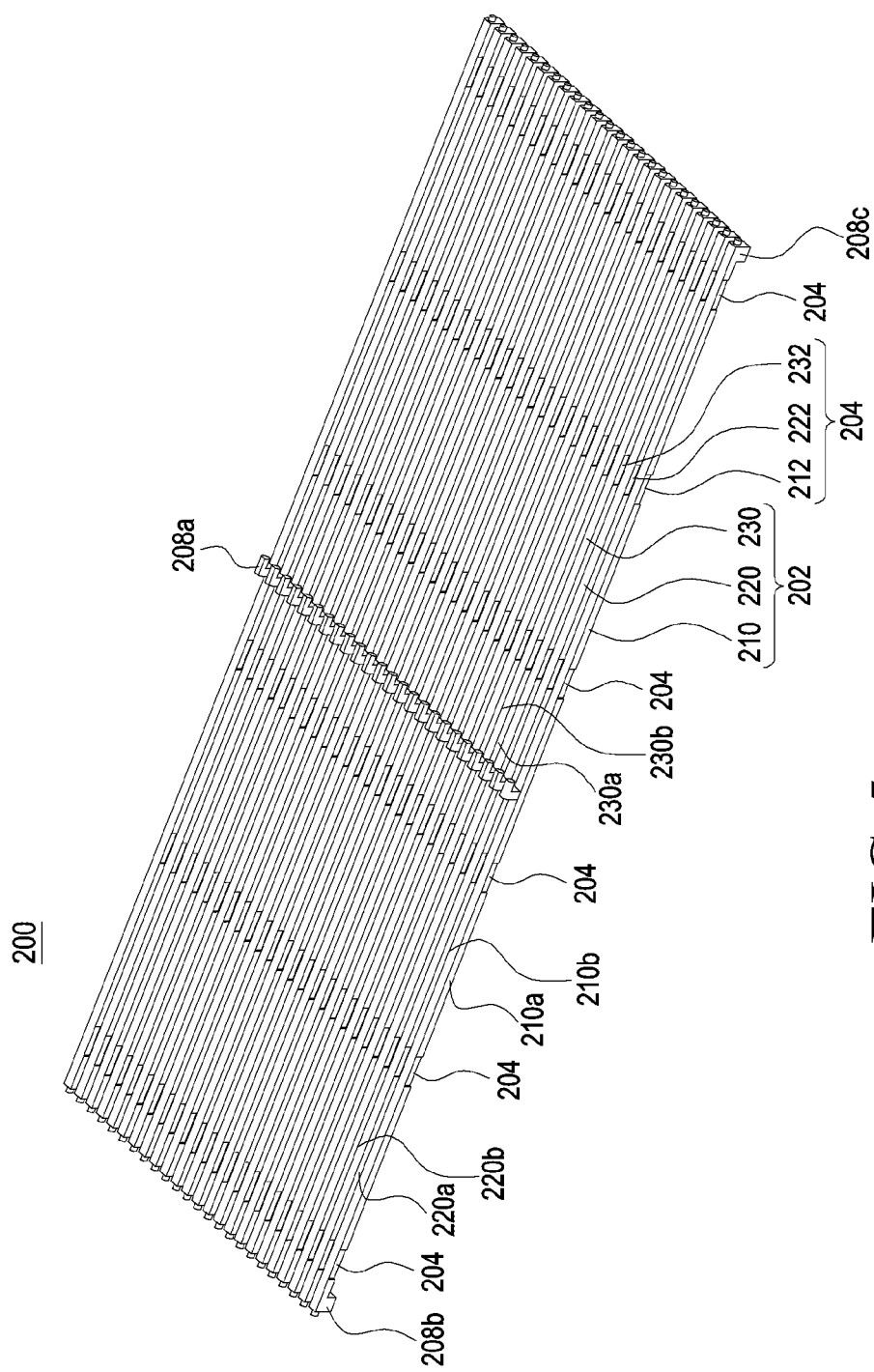
FIG. 5 is a perspective view illustrating a display supporting member according to various example embodiments.
Figure 6:
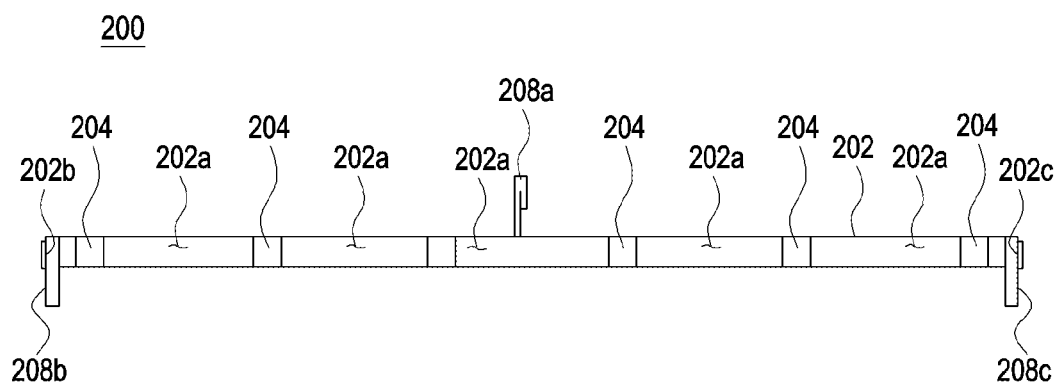
FIG. 6 is a side view illustrating a display supporting member according to various example embodiments.

FIG. 5 is a perspective view illustrating a display supporting member according to various example embodiments. FIG. 6 is a side view illustrating a display supporting member according to various example embodiments.

Referring to FIGS. 5 and 6, a display supporting member 200 may include a plurality of bars 202. The configuration of the display supporting member 200 and bar 202 of FIGS. 5 and 6 may be identical in whole or part to the configuration of the display supporting member 140 and bar 141 of FIGS. 3 and 4.

According to various embodiments, the display supporting member 200 may include a plurality of bars 202 arranged side by side. For example, the display supporting member 200 may include a first bar 210, a second bar 220 disposed substantially parallel to the first bar 210, and a third bar 230 disposed substantially parallel to the second bar 220. According to an embodiment, each bar 202 may be formed substantially in a rod shape. For example, the bar 202 may include a first end portion 202*b*, a second end portion 202*c* opposite to the first end portion 202*b*, and a side surface 202*a* surrounding at least a portion between the first end portion 202*b* and the second end portion 202*c*.

According to various embodiments, the bar 202 may include at least one protruding structure 208*a*, 208*b*, 208*c*. For example, the bar 202 may include a first protruding structure 208*a* extending from the side surface 202*a* of the bar 202, a second protruding structure 208*b* extending from the first end portion 202*b*, and a third protruding structure 208*c* extending from the second end portion 202*c*. According to an embodiment, at least a portion of the first protruding structure 208*a* may be inserted into the accommodating groove 122*a* formed in the base bracket (e.g., the base bracket 122 of FIG. 3). The display supporting member 200 may slide along the accommodating groove 122*a*. According to an embodiment, the first end portion 202*b* may be inserted into the recess (e.g., the recess 128a-1 of FIG. 3) of the first guide member (e.g., the first guide member 128a of FIG. 3), and at least a portion of the second end portion 202b may be inserted into a recess (not shown) of the second guide member (e.g., the second guide member 128b of FIG. 3). The display supporting member 200 may slide along the recess (e.g., the recess 128a-1 of FIG. 3) of the first guide member 128a or the second guide member 128b.

According to various embodiments, the display supporting member 200 may include at least one first processed structure 204. According to an embodiment, the first processed structure 204 may be a cut surface positioned on the side surface 202a. For example, the first processed structure 204 may be a portion of the bar 202 cut through a computer numerical control (CNC) process.

According to various embodiments, the bar 202 may include at least one first processed structure 204. For example, the first bar 210 may include at least one 1-1th processed structure 212, the second bar 220 may include at least one 1-2th processed structure 222, and the third bar 230 may include at least one 1-3th processed structure 232.

According to various embodiments, the display supporting member 200 may include a plurality of the first processed structures 204, and a plurality of the first processed structures 204 may be arranged along the sliding direction of the first housing (e.g., the first housing 110 of FIG. 1). For example, the first processed structures 204 may include a 1-1th processed structure 212 formed in the first bar 210, a 1-2th processed structure 222 formed in the second bar 220, and a 1-3th processed structure 232 formed in the third bar 230.

According to various embodiments, the bars 202 may include a plurality of bars (e.g., the first bar 210, the second bar 220, and the third bar 230) facing each other. For example, the first bar 210 may include a first front surface 210a and a first rear surface 210b opposite to the first front surface 210a, the second bar may include a second front surface 220a facing the first rear surface 210b and a second rear surface 220b opposite to the second front surface 220a, and the third bar 230 may include a third front surface 230a facing the second rear surface 220b and a third rear surface 230b opposite to the third front surface 230a.

According to various embodiments, the first processed structures 204 may include a plurality of processed structures (e.g., 1-1th processed structure 212, 1-2th processed structure 222, and 1-3th processed structure 232) facing each other. According to an embodiment, the 1-2th processed structure 222 may face at least a portion of the 1-1th processed structure 212, and the 1-3th processed structure 232 may face at least a portion of the 1-2th processed structure 222. For example, the 1-1th processed structure 212 may be formed on the surface (e.g., the first front surface 210a and/or the first rear surface 210b) of the first bar 210. The 1-2th processed structure 222 may be formed on the surface (e.g., the second front surface 220a and/or the second rear surface 220b) of the second bar 220. The 1-3th processed structure 232 may be formed on the surface (e.g., the third front surface 230a and/or the third rear surface 230b) of the third bar 230.

According to various embodiments, the shapes of a plurality of the first processed structures 204 may be substantially the same. According to an embodiment, the shape of the 1-2th processed structure 222 may be substantially identical to the shape of the 1-1th processed structure 212 and/or the 1-3th processed structure 232 facing the 1-2th processed structure 222. For example, the shape of the 1-2th processed structure 222 may correspond to the shape of the 1-1th processed structure 212. According to an embodiment, the 1-1th processed structure 212, the 1-2th processed structure 222, and the 1-3th processed structure 232 may be formed as a recess structure (e.g., the recess structure 204 of FIG. 7A) formed in the side surface 202a. According to an embodiment, the 1-1th processed structure 212, the 1-2th processed structure 222, and the 1-3th processed structure 232 may be formed as a protruding structure (e.g., the protruding structure 204 of FIG. 7B) formed on the side surface 202a.

Figure 7A:
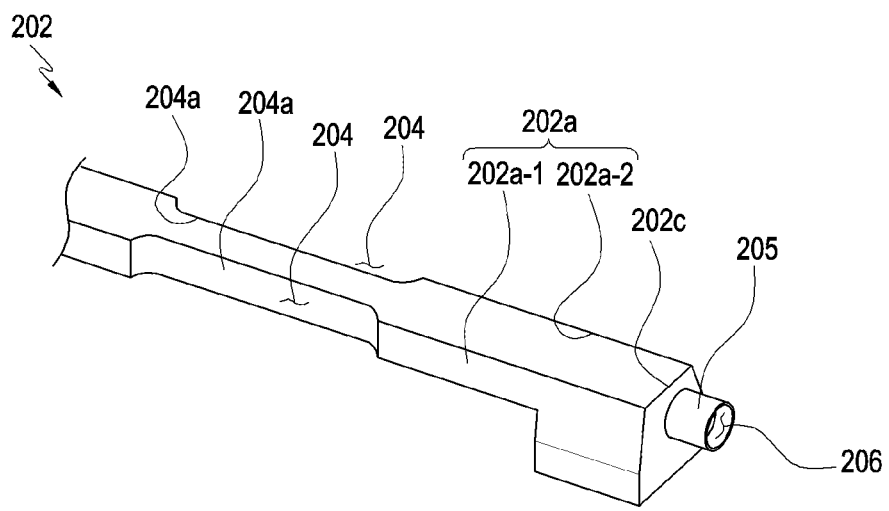
FIGS. 7A and 7B are views illustrating a bar including a first processed structure and a second processed structure according to various example embodiments.
Figure 7B:
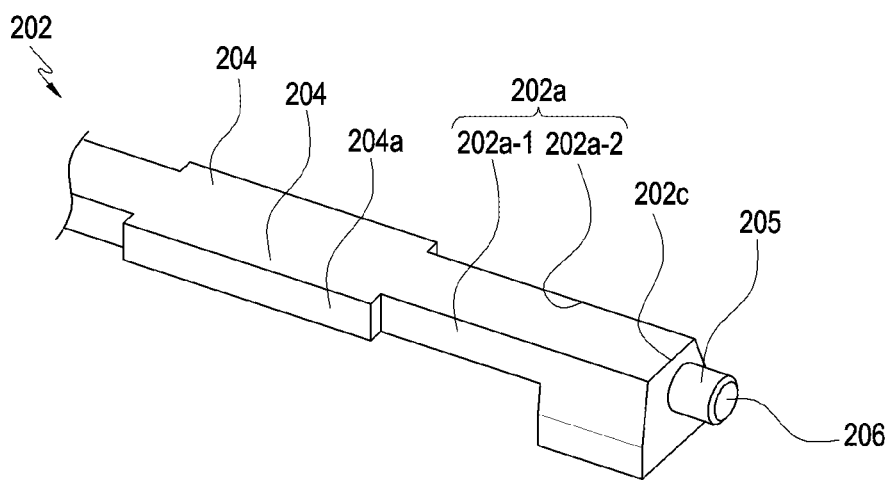

FIGS. 7A and 7B are views illustrating a bar including a first processed structure and a second processed structure according to various example embodiments.

Referring to FIGS. 7A and 7B, the bar 202 may include at least one of a first processed structure 204 and a second processed structure 206. The configuration of the bar 202 of FIGS. 7A and 7B may be identical in whole or part to the configuration of the bar 202 of FIGS. 5 and 6.

According to various embodiments, the first processed structure 204 may be formed on the side surface 202a of the bar 202. According to an embodiment, the first processed structure 204 may be formed on at least one of a first side surface 202a-1 or a second side surface 202a-2 opposite to the first side surface 202a-2, For example, the bar 202 may include a first processed structure 204 formed on the first side surface 202a-1 and the second side surface 202a-2. As another example, the bar 202 may include a first processed structure 204 formed on the first side surface 202a-1 or the second side surface 202a-2.

According to various embodiments, the first processed structure 204 may be formed to protrude or be depressed (e.g., recess shape) from the side surface 202a of the bar 202. For example, the first surface 204a of the first processed structure 204 may be substantially parallel to the side surface 202a of the bar 202. According to an embodiment (e.g., FIG. 7A), the first processed structure 204 may be a recess structure or a recess shape formed in the side surface 202a of the bar 202. According to an embodiment (e.g., FIG. 7B), the first processed structure 204 may be a protruding structure or a recess shape extending from the side surface 202a of the bar 202. The first processed structure 204 may be formed on at least one of the first side surface 202a-1 (e.g., the first front surface 210a, the second front surface 220a, or the third front surface 230a of FIG. 5) or the second side surface 202a-2 (e.g., the first rear surface 210b, the second rear surface 220b, or the third rear surface 230b of FIG. 5). According to an embodiment (e.g., FIG. 7B), the bar 202 may include a first processed structure 204 protruding from the first side surface 202a-1 and the second side surface 202a-1. According to another embodiment (not shown), the bar 202 may include a first processed structure 204 that protrudes from the first side surface 202a-1 and is recessed in the second side surface 202a-2. According to another embodiment (e.g., FIG. 7A), the bar 202 may include a first processed structure 204 that is recessed in the first side surface 202a-1 and the second side surface 202a-2.

According to an embodiment, the first surface 204a of the recess-shaped first processed structure 204 may be a circular or elliptical curved surface. For example, a cutting tool (not shown) for cutting the display supporting member 200 may cut the bar 202 into a portion of a circle (e.g., an arc shape). The first processed structure 204 may be formed in a shape corresponding to the cut surface of the curved surface of the cutting tool.

According to various embodiments, the plurality of bars 202 may be formed in substantially the same length. For example, the bar 202 of the display supporting member (e.g., display supporting member 200 of FIG. 5) may include a protruding structure 205 that protrudes from a first end portion (e.g., the first end portion 202b of FIG. 6) and/or a second end portion 202c. The bar 202 may include a second processed structure 206 formed on the protruding structure 205.

According to various embodiments, the second processed structure 206 may be formed in various shapes. According to an embodiment (e.g., FIG. 7A), the second processed structure 206 may be a recess structure formed in the protruding structure 205. According to an embodiment (e.g., FIG. 7B), the second processed structure 206 may be a protrusion structure extending from the protrusion structure 205. According to an embodiment, at least one processed structure 206 positioned in the same direction among the plurality of second processed structures 206 may have substantially the same shape.

Figure 8:
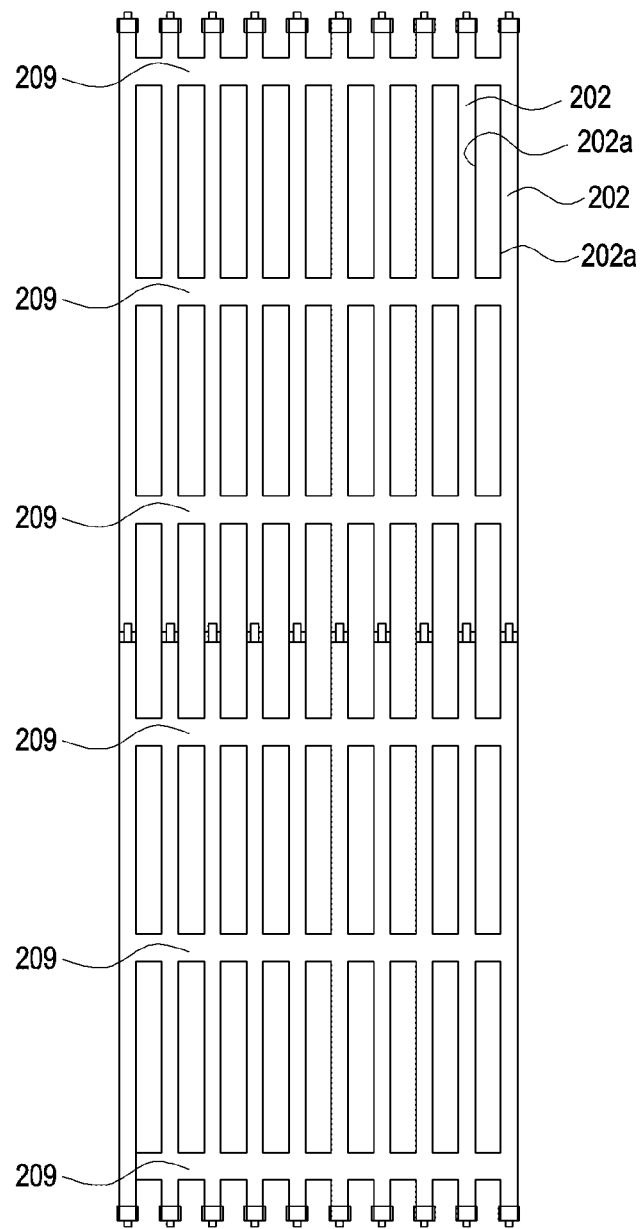
FIG. 8 is a view illustrating a process of manufacturing a display supporting member according to various example embodiments.

FIG. 8 is a view illustrating a process of manufacturing a display supporting member according to various example embodiments.

Referring to FIG. 8, the display supporting member 200 may include a plurality of bars 202 connected by a bridge structure 209. The bridge structure 209 may extend from a side surface 202a of one bar 202 to a side surface 202a of another bar 202. The configuration of the display supporting member 200 of FIG. 8 may be identical in whole or part to the configuration of the display supporting member 200 of FIGS. 5 and 6.

According to various embodiments, the display supporting member 200 may be manufactured using injection molding. For example, the display supporting member 200 may be formed by die casting or metal injection molding (MIM). According to an embodiment, the display supporting member 200 formed through die casting or metal injection molding may include a plurality of bars 202 connected by the bridge structure 209.

According to various embodiments, the bridge structure 209 may be removed from the electronic device. For example, the bridge structure 209 may be removed from the display supporting member 200 by a cutting process (e.g., a computer numerical control (CNC) process). According to an embodiment, a portion of the bar 202 where the bridge structure 209 is removed may be interpreted as a first processed structure (e.g., the first processed structure 204 of FIG. 5). For example, the first processed structure 204 may be a portion of the bar 202 that has been cut through a cutting process.

Figure 9:
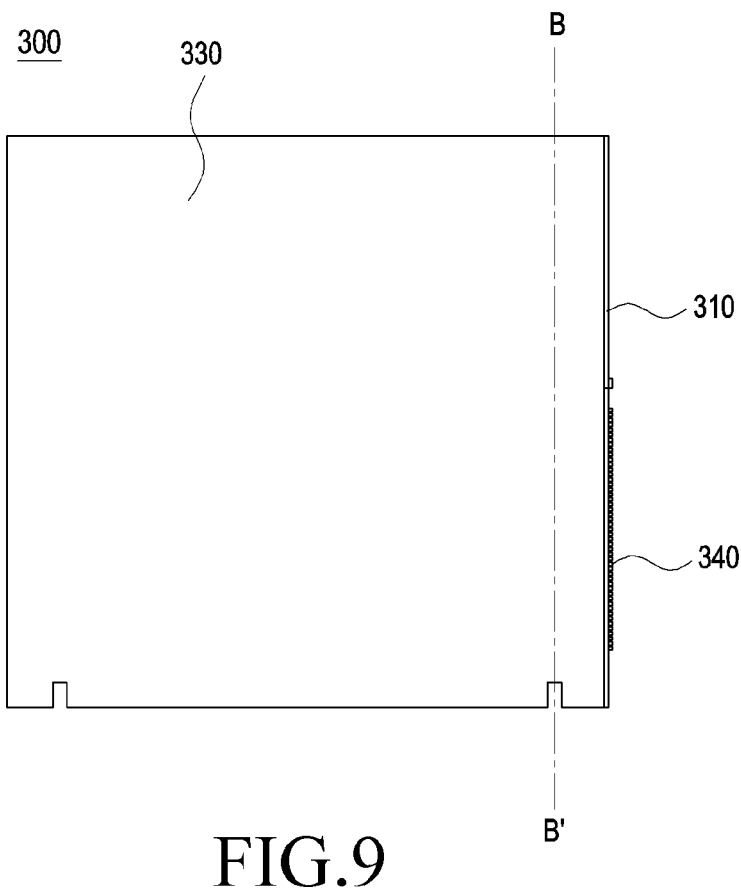
FIG. 9 is a front view illustrating an electronic device according to various example embodiments.
Figure 10:
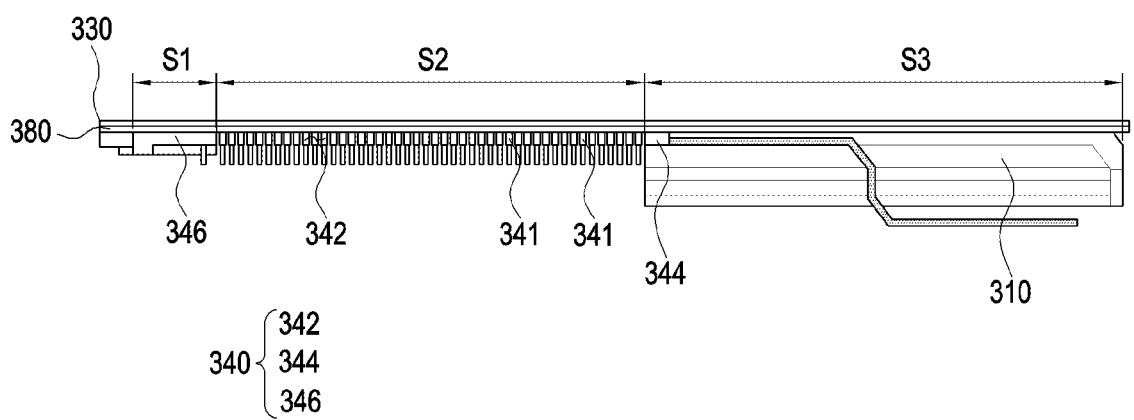
FIG. 10 is a cross-sectional view taken along line B-B' of FIG. 9.
Figure 11A:
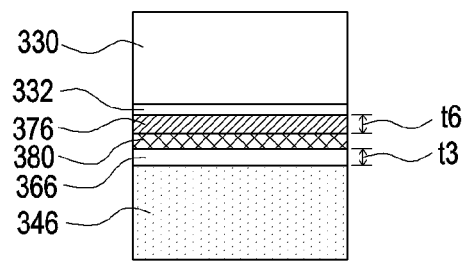
FIG. 11A is a cross-sectional view illustrating area A of FIG. 10.
Figure 11B:
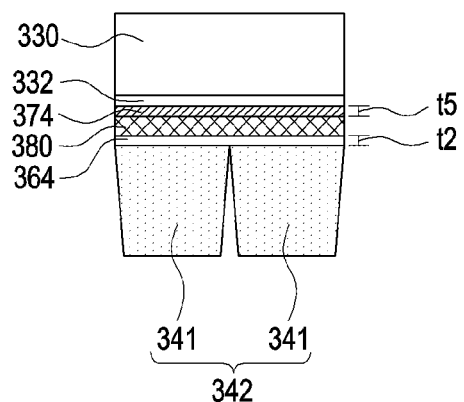
FIG. 11B is a cross-sectional view illustrating area B of FIG. 10.
Figure 11C:
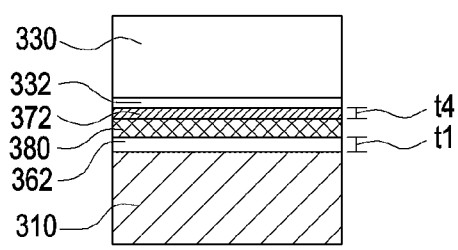
FIG. 11C is a cross-sectional view illustrating area C of FIG. 10.

FIG. 9 is a front view illustrating an electronic device according to various example embodiments. FIG. 10 is a cross-sectional view taken along line B-B' of FIG. 9. FIG. 11A is a cross-sectional view illustrating a first area S1 of FIG. 10, FIG. 11B is a cross-sectional view illustrating a second area S2 of FIG. 10, and FIG. 11C is a cross-sectional view illustrating a third area S3 of FIG. 10.

Referring to FIGS. 9, 10, 11A, 11B, and 11C, an electronic device 300 may include a display 330 disposed on a first housing 310 and a display supporting member 340. The display supporting member 340 may include a multi-bar assembly 342 including a plurality of bars 341, a first bracket 344 positioned on one end portion of the multi-bar assembly 342, and a second bracket 345 positioned on the other end portion 342 of the multi-bar assembly 342. The configuration of the first housing 310, the display 330, the display supporting member 340, the multi-bar assembly 342, the first bracket 344, and the second bracket 346 of FIGS. 9, 10, 11A, 11B, and 11C may be identical in whole or part to the configuration of the first housing 110, the display 130, the display supporting member 140, the multi-bar assembly 142, the first bracket 144, and the second bracket 146 of FIG. 3 and/or FIG. 4.

According to various embodiments, the electronic device 300 may include a supporting plate 380. According to an embodiment, at least a portion of the supporting plate 380 may be disposed between the display 330 and the display supporting member 340. According to an embodiment, the supporting plate 380 may include a plurality of through holes (not shown). For example, the supporting plate 380 may include a lattice structure. According to an embodiment, the rigidity of the display 330 at least partially supported by the supporting plate 380 may be larger than that of the display 330 not including the supporting plate 380. According to an embodiment, the supporting plate 380 may include metal (e.g., stainless steel or aluminum).

According to various embodiments, the electronic device 300 may include a first adhesive member 360. According to an embodiment, the first adhesive member 360 may prevent or reduce escape of the display 330 from the display supporting member 340 or the first housing 310. According to an embodiment, the first adhesive member 360 may couple the display 330 to the first housing 310 or the display supporting member 340 of the electronic device 300. For example, the first adhesive member 360 may be disposed between the display 330 (e.g., the first display area A1 of FIG. 2) and the first housing 310 and/or the display 330 (e.g., the second display area A2 of FIG. 2). According to an embodiment, the first adhesive member 360 may be disposed between the supporting plate 380 and the display supporting member 340 or between the supporting plate 380 and the first housing 310. For example, the first adhesive member 360 may include a 1-1th adhesive member 362 disposed between the supporting plate 380 and the first housing 310 and/or between the supporting plate 380 and the first bracket 344 (e.g., the first bracket 144 of FIG. 4) and a 1-2th adhesive member 364 disposed between the supporting plate 380 and the plurality of bars 341 of the display supporting member 340. According to an embodiment, the first adhesive member 360 may include a 1-3th adhesive member 366. For example, the display supporting member 340 may include a second bracket 346 (e.g., the second bracket 146 of FIG. 4), and the 1-3th adhesive member 366 may be disposed between the supporting plate 380 and the second bracket 346.

According to various embodiments, the first adhesive member 360 may enhance surface quality of the display 330. For example, the 1-2th adhesive member 364 may be formed to have an elastic modulus greater than that of the 1-1th adhesive member 362 and/or the 1-3th adhesive member 364 to correspond to the slide of the plurality of bars 341 of the display supporting member 340. According to an embodiment, the 1-2th adhesive member 364 may be a non-backing double-sided tape or adhesive, and the 1-1th adhesive member 362 and/or the 1-3th adhesive member 366 may be a backing double-sided tape or adhesive. According to an embodiment, the second thickness t2 of the 1-2th adhesive member 364 may be smaller than the first thickness t1 of the 1-1th adhesive member 362 and/or the third thickness t3 of the 1-3th adhesive member 366. For example, the second thickness t2 may be about 0.025 mm, and the first thickness t1 or the third thickness t3 may be about 0.25 mm.

According to various embodiments, the electronic device 300 may include second adhesive members 372, 374, and 376 disposed between the display 330 and the supporting plate 380. According to an embodiment, the second adhesive members 372, 374, and 376 may be non-backing double-sided tapes. According to an embodiment, the second adhesive members 372, 374, and 376 may include a 2-1th adhesive member 372 disposed above the 1-1th adhesive member 362, a 2-2th adhesive member 374 disposed above the 1-2th adhesive member 364, and a 2-3th adhesive member 376 disposed above the 1-3th adhesive member 366. According to an embodiment, the thicknesses of the second adhesive members 372, 374, and 376 may be substantially uniform. For example, the fourth thickness t4 of the 2-1st adhesive member 372, the fifth thickness t5 of the 2-2th adhesive member 374, and the sixth thickness t6 of the 2-3th adhesive member 376 may be about 0.025 mm According to an embodiment, the thicknesses (e.g., the fourth thickness t4, the fifth thickness t5, or the sixth thickness t6) of the second adhesive members 372, 374, and 376 may be substantially identical to the second thickness t2 of the 1-2th adhesive member 364.

According to various embodiments, the display 330 may include a cushioning member 332. According to an embodiment, at least a portion of the cushioning member 332 may be disposed between the display 330 and the display supporting member 340. For example, the cushioning member 332 may be disposed between the display 330 and the second adhesive members 372, 374, and 376. According to an embodiment, the cushioning member 332 may be foam (e.g., sponge).

Figure 12:
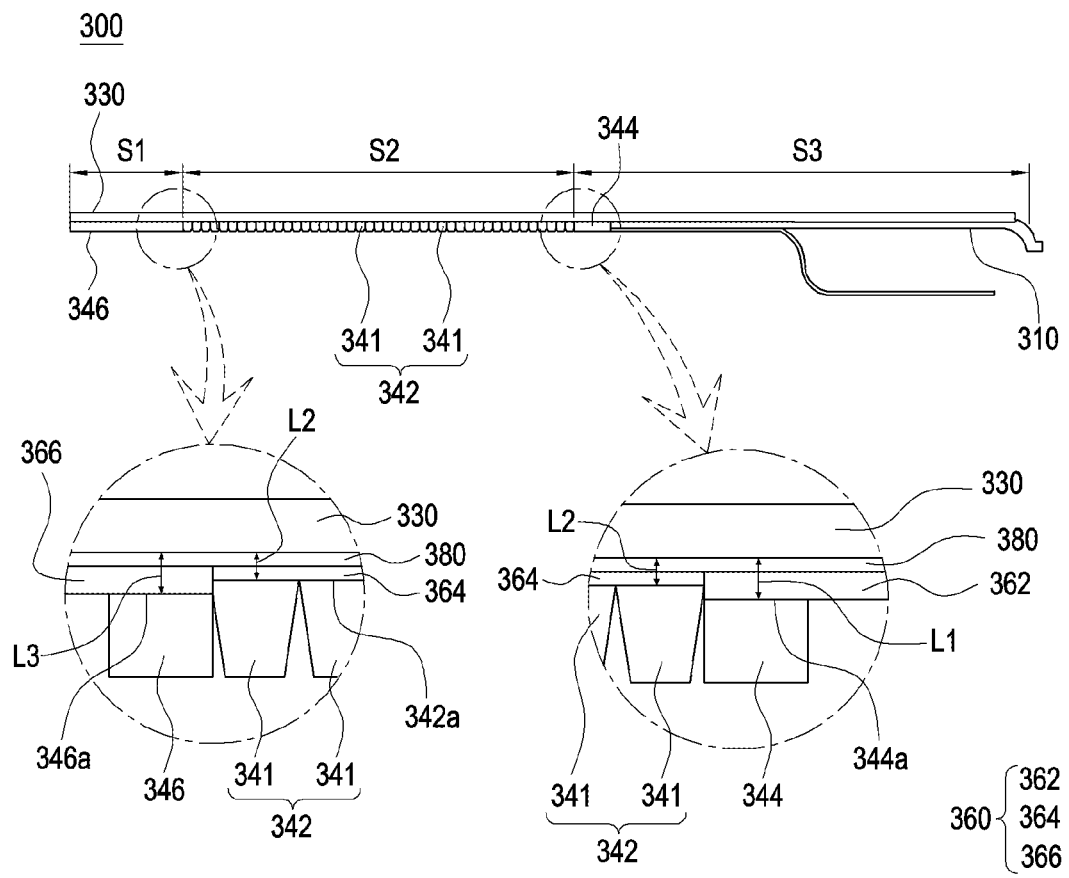
FIG. 12 is a side view illustrating a display supporting member and a first housing according to various example embodiments.

FIG. 12 is a side view illustrating a display supporting member and a first housing according to various example embodiments.

Referring to FIG. 12, an electronic device 300 may include a first housing 310, a display 330, and a display supporting member 340. As described above, the display 330 may be disposed on the rear plate 380 that is substantially flat. For example, the rear plate 380 may be disposed on the first adhesive member 360 that is substantially flat, and the display 330 may be disposed on the rear plate 380. According to an embodiment, the electronic device 300 may include a first area S1 where the 1-1th adhesive member 362 is disposed, a second area S2 where the 1-2th adhesive member 364 is disposed, and a third area S3 where the 1-3th adhesive member 366 is disposed. The configuration of the electronic device 300, the first housing 310, the display 330, and the display supporting member 340 of FIG. 12 may be identical in whole or part to the configuration of the first housing 310, the display 330, and the display supporting member 340 of FIG. 9, 10, 11A, 11B, or 11C.

According to various embodiments, the display supporting member 340 may be formed to correspond to the thickness of the first adhesive member 360. For example, the multi-bar assembly 342 may be formed to protrude toward the display 330 beyond the first bracket 344, the second bracket 346, or the first housing 310. According to an embodiment, the thickness (e.g., the second thickness t2 of FIG. 11B) of the 1-2th adhesive member 364 may be smaller than the thickness (e.g., the first thickness t1 of FIG. 11C) of the 1-1th adhesive member 362 or the thickness (e.g., the third thickness t3 of FIG. 11A) of the 1-3th adhesive member 366. According to an embodiment, the first distance L1 between the first housing 310 or the first bracket 344 and the display 330 or the third distance l3 between the second bracket 346 and the display 330 may be longer than the second distance L2 between the plurality of bars 341 and the display 330. For example, the distance L2 between the display 330 and the first surface 342a of the plurality of bars 341 where the 1-2th adhesive member 364 is attached may be shorter than the third distance l3 between the display and the second surface 344a of the first bracket 344 where the 1-1th adhesive member 362 is attached or the first distance L1 between the display and the third surface 344a of the second bracket 346 where the 1-3th adhesive member 366 is attached.

According to various example embodiments, an electronic device (e.g., the electronic device 100 of FIG. 2) may comprise a housing (e.g., the housings 110 and 120) including a first housing (e.g., the first housing 110 of FIG. 2) and a second housing (e.g., the second housing 120 of FIG. 2) configure to accommodate at least a portion of the first housing and to guide a slide of the first housing, a flexible display (e.g., the flexible display 130 of FIG. 2) including a first display area (e.g., the first display area A1 of FIG. 2) connected with the first housing and a second display area (e.g., the second display area A2 of FIG. 2) extending from the first display area, and a display supporting member (e.g., the display supporting member 140 of FIG. 3) supporting at least a portion of the second display area. The display supporting member may include a plurality of bars (e.g., the bars 202 of FIG. 5) arranged side by side and including a first processed structure (e.g., the first processed structure 204 of FIG. 5) formed on a side surface (e.g., the side surface 202a of FIG. 6) thereof. The plurality of bars may include a first bar (e.g., the first bar 210 of FIG. 5) including a 1-1th processed structure (e.g., the 1-1th processed structure 212 of FIG. 5) shaped as a protrusion or a recess and a second bar (e.g., the second bar 220 of FIG. 5) including a 1-2th processed structure (e.g., the 1-2th processed structure 222 of FIG. 5) at least partially facing the 1-1th processed structure and corresponding in shape to the 1-1th processed structure.

According to various embodiments, the plurality of bars may include at least one protruding structure (e.g., the protruding structure 205 of FIG. 7A) protruding from at least one end portion (e.g., the first end portion 202b and/or second end portion 202c of FIG. 6) thereof and at least one second processed structure (e.g., the second processed structure 206 of FIG. 7A) formed on the protruding structure.

According to various embodiments, the first processed structure may be formed on a first side surface (e.g., the first side surface 202a-1 of FIG. 7A) of the plurality of bars and a second side surface (e.g., the second side surface 202a-2 of FIG. 7A) opposite to the first side surface.

According to various embodiments, the first processed structure may be a cut surface positioned on a side surface of the plurality of bars.

According to various embodiments, the electronic device may further comprise a first adhesive member (e.g., the second adhesive member 360 of FIG. 12) including a 1-1th adhesive member (e.g., the first adhesive member 362 of FIG. 11C) disposed between the flexible display and the first housing and a 1-2th adhesive member (e.g., the second adhesive member 364 of FIG. 11B) disposed between the flexible display and the plurality of bars. An elastic modulus of the 1-2th adhesive member may be greater than an elastic modulus of the 1-1th adhesive member.

According to various embodiments, the electronic device may further comprise a supporting plate (e.g., the supporting plate 380 of FIG. 10) including a plurality of through holes (not shown). The first adhesive member may be disposed between the supporting plate and the display supporting member.

According to various embodiments, the electronic device may further comprise a second adhesive member (e.g., the 2-1th adhesive member 372 of FIG. 11C, the 2-2th adhesive member 374 of FIG. 11B, and/or the 2-3th adhesive member 376 of FIG. 11C) disposed between the flexible display and the supporting plate.

According to various embodiments, the 1-1th adhesive member may be a backing tape, and the 1-2th adhesive member may be a non-backing tape.

According to various embodiments, the display supporting member may include a second bracket (e.g., the second bracket 346 of FIG. 10) disposed under the second display area. The plurality of bars may be positioned between the second bracket and the first housing.

According to various embodiments, the first adhesive member may include a 1-3th adhesive member (e.g., the 1-3th adhesive member 366 of FIG. 11A) disposed between the second display area and the second bracket. An elastic modulus of the 1-2th adhesive member may be greater than an elastic modulus of the 1-3th adhesive member.

According to various embodiments, a first thickness (e.g., the first thickness t1 of FIG. 11C) of the 1-1th adhesive member may be greater than a second thickness (e.g., the second thickness t2 of FIG. 11B) of the 1-2th adhesive member.

According to various embodiments, the second housing may include at least one accommodating groove (e.g., the accommodating groove 122a of FIG. 3). The display supporting member may include at least one protruding structure (e.g., the first protruding structure 208a of FIG. 5) extending from the plurality of bars and having at least a portion inserted into the at least one accommodating groove.

According to various embodiments, the electronic device may further comprise a first roller (e.g., the first roller 151 of FIG. 4) facing the second display area to guide a movement of the flexible display.

According to various embodiments, the display supporting member may be formed using die casting or metal injection molding.

According to various example embodiments, an electronic device (e.g., the electronic device 100 of FIG. 2) may comprise a housing (e.g., the first housing 110 and second housing 120 of FIG. 2) including a first housing (e.g., the first housing 110 of FIG. 2) and a second housing (e.g., the second housing 120 of FIG. 2) for receiving at least a portion of the first housing and guiding a slide of the first housing, a flexible display (e.g., the flexible display 130 of FIG. 2) including a first display area (e.g., the first display area A1 of FIG. 2) connected with the first housing and a second display area (e.g., the second display area A2 of FIG. 2) extending from the first display area, a display supporting member (e.g., the display supporting member 200 of FIG. 5) including a plurality of bars (e.g., the bars 202 of FIG. 5) including at least one first processed structure (e.g., the first processed structure 204 of FIG. 5) formed on a side surface (e.g., the side surface 202a of FIG. 6) thereof, and a first adhesive member (e.g., the first adhesive member 360 of FIG. 12) including a 1-1th adhesive member (e.g., the 1-1th adhesive member 362 of FIG. 12) disposed between the first display area and the first housing and a 1-2th adhesive member (e.g., the 1-2th adhesive member 364 of FIG. 12) disposed between the second display area and the plurality of bars. An elastic modulus of the 1-2th adhesive member may be greater than an elastic modulus of the 1-1th adhesive member.

According to various embodiments, the plurality of bars may include a first bar (e.g., the first bar 210 of FIG. 5) including at least one 1-1th processed structure (e.g., the 1-1th processed structure 212 of FIG. 5) and a second bar (e.g., the second bar 220 of FIG. 5) including at least one 1-2th processed structure (e.g., the 1-2th processed structure 222 of FIG. 5) facing the at least one 1-1th processed structure According to various embodiments, the plurality of bars may include at least one protruding structure (e.g., the protruding structure 206 of FIG. 7A) protruding from at least one end portion thereof and at least one second processed structure (e.g., the processed structure 206 of FIG. 7B) formed on the protruding structure.

According to various embodiments, the electronic device may further comprise a supporting plate (e.g., the supporting plate 380 of FIG. 10) including a plurality of through holes and a second adhesive member (e.g., the 2-1th adhesive member 372 of FIG. 11C, the 2-2th adhesive member 374 of FIG. 11B, and/or the 2-3th adhesive member 376 of FIG. 11C) disposed between the flexible display and the supporting plate. The first adhesive member may be disposed between the supporting plate and the display supporting member.

According to various embodiments, the display supporting member may include a second bracket disposed under the second display area. The plurality of bars may be positioned between the second bracket and the first housing.

The first adhesive member may include a 1-3th adhesive member (e.g., the 1-3th adhesive member 366 of FIG. 11A) disposed between the second display area and the second bracket. An elastic modulus of the 1-2th adhesive member may be greater than an elastic modulus of the 1-3th adhesive member.

It is apparent to one of ordinary skill in the art that an electronic device including a display supporting member as described above are not limited to the above-described embodiments and those shown in the drawings, and various changes, modifications, or alterations may be made thereto without departing from the scope of the disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a housing including a first housing and a second housing configured to accommodate at least a portion of the first housing and guide a sliding movement of the first housing;
a flexible display including a first display area connected with the first housing and a second display area extending from the first display area; and
a display support configured for supporting at least a portion of the second display area,
wherein the display support includes a plurality of bars arranged side by side and including a first processed structure formed on a side surface of the plurality of bars, the first processed structure formed along the side surface of the plurality of bars and spaced apart from longitudinal ends of the plurality of bars and comprising a recess or a protrusion; and
wherein the plurality of bars include a first bar including a 1-1th processed structure of the first processed structure and a second bar, which is disposed side by side with the first bar, including a 1-2th processed structure of the first processed structure, and wherein when the 1-1th processed structure includes a first recess, the 1-2th processed structure includes a second recess facing the first recess, and when the 1-1th processed structure includes a first protrusion, the 1-2th processed structure includes a second protrusion facing the first protrusion.

2. The electronic device of claim 1, wherein the plurality of bars include:
   at least one protruding structure, comprising a protrusion, protruding from at least one end portion thereof; and
   at least one second processed structure, comprising a recess and/or protrusion, formed on the protruding structure.

3. The electronic device of claim 1, wherein the first processed structure is formed on at least a first side surface of the plurality of bars and a second side surface of the plurality of bars opposite to the first side surface.

4. The electronic device of claim 1, wherein the first processed structure comprises a cut surface positioned on the side surface of the plurality of bars.

5. The electronic device of claim 1, further comprising a first adhesive member including:
   a 1-1th adhesive member disposed between at least the flexible display and the first housing; and
   a 1-2th adhesive member disposed between at least the flexible display and the plurality of bars,
   wherein an elastic modulus of the 1-2th adhesive member is greater than an elastic modulus of the 1-1th adhesive member.

6. The electronic device of claim 5, further comprising a supporting plate including a plurality of through holes,
   wherein the first adhesive member is disposed between at least the supporting plate and the display support.

7. The electronic device of claim 6, further comprising a second adhesive member disposed between at least the flexible display and the supporting plate.

8. The electronic device of claim 5, wherein the 1-1th adhesive member comprises a backing tape, and the 1-2th adhesive member comprises a non-backing tape.

9. The electronic device of claim 5, wherein the display support includes a second bracket disposed under at least the second display area, and wherein the plurality of bars are positioned between at least the second bracket and the first housing.

10. The electronic device of claim 9, wherein the first adhesive member includes a 1-3th adhesive member disposed between at least the second display area and the second bracket, and wherein an elastic modulus of the 1-2th adhesive member is greater than an elastic modulus of the 1-3th adhesive member.

11. The electronic device of claim 5, wherein a first thickness of the 1-1th adhesive member is greater than a second thickness of the 1-2th adhesive member.

12. The electronic device of claim 1, wherein the second housing includes at least one accommodating groove, and
   wherein the display support includes at least one protruding structure comprising a protrusion extending from the plurality of bars, at least a portion of the protruding structure is configured to be inserted into the at least one accommodating groove.

13. The electronic device of claim 1, further comprising a first roller facing the second display area and configured to guide a movement of the flexible display.

14. The electronic device of claim 1, wherein the display support is formed using die casting or metal injection molding.

* * * * *